(12) United States Patent
Villaro Amurrio (10) Patent No.: US 11,719,110 B2
(45) Date of Patent: Aug. 8, 2023

(54) TURBINE GUIDE VANE

(71) Applicant: ITP NEXT GENERATION TURBINES, S.L., Vizcaya (ES)

(72) Inventor: Mikel Villaro Amurrio, Vizcaya (ES)

(73) Assignee: ITP NEXT GENERATION TURBINES, S.L., Vizcaya (ES)

( * ) Notice: Subject to any disclaimer, the term of this patent is extended or adjusted under 35 U.S.C. 154(b) by 0 days.

(21) Appl. No.: 17/489,468

(22) Filed: Sep. 29, 2021

(65) Prior Publication Data

US 2022/0186625 A1 Jun. 16, 2022

(30) Foreign Application Priority Data

Sep. 30, 2020 (EP) ..................................... 20382868

(51) Int. Cl.
*F01D 9/04* (2006.01)
*F01D 17/16* (2006.01)
*B33Y 80/00* (2015.01)

(52) U.S. Cl.
CPC ............ *F01D 9/041* (2013.01); *F01D 17/162* (2013.01); *B33Y 80/00* (2014.12);
(Continued)

(58) Field of Classification Search
CPC ........ F01D 9/041; F01D 17/162; F01D 5/147; F01D 9/042; F01D 5/141
See application file for complete search history.

(56) References Cited

U.S. PATENT DOCUMENTS

| | | | | |
|---|---|---|---|---|
| 5,269,058 A | * | 12/1993 | Wiggs | ..................... F01D 5/147 29/889.7 |
| 7,422,415 B2 | * | 9/2008 | Burdgick | ................ F01D 5/186 415/169.1 |

(Continued)

FOREIGN PATENT DOCUMENTS

| | | |
|---|---|---|
| EP | 3680060 A1 | 7/2020 |
| WO | WO 2018/211270 A1 | 11/2018 |

OTHER PUBLICATIONS

Extended European Search Report issued in European Patent Application No. 20382868.6, dated Feb. 19, 2021, in 2 pages.

*Primary Examiner* — Brian Christopher Delrue
(74) *Attorney, Agent, or Firm* — Knobbe, Martens, Olson & Bear, LLP (57) ABSTRACT

A guide vane for a vane assembly of a turbo machine, the guide vane can include: an aerofoil body including: a forward portion, a rear portion, and opposite outer surfaces, extending between the forward portion and the rear portion, a liner shaped with a sheet like geometry, the liner being configured for being fixed to the aerofoil body, the liner including: a first portion configured for being connected to the forward portion of the aerofoil body, a trailing edge portion shaped with a convex geometry, a first coupling portion extending between the first portion and the trailing edge portion, and configured for being fixed to an outer surface of the aerofoil body, a second portion extending from the trailing edge portion and configured for being connected to the rear portion of the aerofoil body, wherein when the first coupling portion of the liner is fixed to an outer surface of the aerofoil body: the trailing edge portion of the liner extends from the rear portion of the aerofoil body, and the second portion of the liner is connected to the rear portion of the aerofoil body, thus forming a cavity (Continued)

between the rear portion of the aerofoil body and the trailing edge portion of the liner.

18 Claims, 3 Drawing Sheets

(52) U.S. Cl.
CPC .... *F05D 2230/232* (2013.01); *F05D 2230/31* (2013.01); *F05D 2240/122* (2013.01)

(56) References Cited

U.S. PATENT DOCUMENTS

| | | | |
|---|---|---|---|
| 11,014,190 B2* | 5/2021 | Malmborg | B21D 53/78 |
| 11,346,320 B2* | 5/2022 | Larsen | F03D 13/10 |
| 2014/0030065 A1* | 1/2014 | Nakano | F01D 25/32 |
| | | | 415/115 |
| 2014/0130354 A1* | 5/2014 | Pal | B23H 9/14 |
| | | | 29/889.22 |
| 2014/0271153 A1* | 9/2014 | Uskert | F01D 5/187 |
| | | | 415/177 |
| 2015/0026980 A1* | 1/2015 | Tellier | F04D 29/324 |
| | | | 29/889.1 |
| 2015/0354411 A1* | 12/2015 | Scott | F01D 25/24 |
| | | | 29/889.21 |
| 2016/0145758 A1* | 5/2016 | King | C25D 9/02 |
| | | | 205/117 |
| 2018/0030995 A1* | 2/2018 | Weisse | F01D 5/147 |
| 2020/0215642 A1* | 7/2020 | Malmborg | F01D 5/18 |
| 2022/0127966 A1* | 4/2022 | Bales | B23K 1/0018 |

* cited by examiner

TURBINE GUIDE VANE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure belongs to the technical field of outlet guide vanes in turbo machines, e.g. gas turbine engines, and, particularly, it aims at a weight reduction in said outlet guide vanes without jeopardizing performances by structural modifications.

In particular, it is proposed to extend the acoustic liner typically found in the pocket of these guide vanes for noise reduction purposes in order to provide aero shape continuity thus enabling dispensing with the parasitic mass of either the former solid trailing edge or leading edge which are now replaced in shaped by said acoustic liner.

Description of the Related Art

Outlet guide vanes, the so-called 'OGV', are radially oriented vanes or airfoil struts housed within annular casings in cascade and arranged ahead of a nozzle for stabilizing or redirecting an incoming rotary airflow, such as de-swirling the incoming flow from the last low-pressure turbine rotor-stage into an axial outflow. Typical places for these outlet guide vanes in a gas turbine engine are tail bearing housing ('TBH') support structures such as the one at the fan or before the exit nozzle, for instance.

As known, OGV are high-demanded structures both in terms of structural loads and aerodynamics thus leading to compromise solutions resulting in thick aerofoils very susceptible to flow separation depending on off-design engine regime. Thus, manufacturing plays a decisive role to keep the tight tolerances imposed by design upon aerodynamic studies.

With the advent initiatives of reducing noise levels in produced aircrafts such as the Clean Sky program, outlet guide vanes are now acoustically lined acting as a passive noise control system. These liners are well-known noise attenuation structures in the form of a sandwich panel basically including a porous sheet, a cell structure of appropriate characteristics, e.g. honeycomb structure, and a backing sheet.

As per the tolerances in the design and the high-performance materials that the OGV needs to be manufactured with, typically metal alloys, current outlet guide vanes are manufactured by casting thus resulting in a cast piece including the vane itself and part of the inner and outer annulus. Nevertheless, their existing manufacturing process does not allow integrating and attaching the noise reduction liner in one shot and, thus, a solution is to generate a pocket in the guide vane upper surface (i.e. suction face) for the liner to be embedded therein while completing the aerodynamic shape of the outlet guide vane.

Unfortunately, this current solution entails an increase in the guide vane aerodynamic shape, giving rise to an increase of the axial length of both the inner and the outer skins of the tail bearing housing, and thus an increase of the total length of the engine.

In particular, as is the case for most aerodynamic structures, which must comply with particular aspect ratios determined during the corresponding design phase, vanes are defined by a thickness-to-chord ratio without the presence of the noise reduction liner, a ratio that must be maintained after its final integration.

Consequently, since that relationship must be maintained after coupling the element, and given that this integration of elements involves a thickening of the resulting aerodynamic profile of the guide vane, its length should also be increased in order to maintain said aspect ratio (and thus the length of both the inner and outer skins of the tail bearing housing, as indicated in previous paragraphs).

For this reason, the weight of the overall tail bearing housing, including the outlet guide vanes, significantly increases. Moreover, this extra weight increase, imposed in order to comply with the tight aerodynamic ratios of the components, is not needed to withstand the thermo-mechanical loads the whole structure undergoes. Said weight increase is merely the result of the introduction of a 'parasitic' mass which does not contribute to improving the thermo-mechanical behaviour of the whole structure, given that the components bear the same given thermo-mechanical loads previous to the integration of the noise liner.

SUMMARY

The present disclosure provides a solution for the aforementioned problems, by a guide vane according to claim 1. The disclosure also provides a vane assembly, a turbo machine, and an aircraft. Advantageous embodiments are defined in the dependent claims.

In a first inventive aspect, the disclosure provides a guide vane for a vane assembly of a turbo machine, the guide vane comprising:
an aerofoil body comprising:
  a forward portion,
  a rear portion, and
  opposite outer surfaces, extending between the forward portion and the rear portion,
a liner configured for being fixed to the aerofoil body, the liner comprising:
  a first portion configured for being connected to the forward portion of the aerofoil body,
  a trailing edge portion shaped with a convex geometry,
  a first coupling portion extending between the first portion and the trailing edge portion, and configured for being fixed to an outer surface of the aerofoil body,
  a second portion extending from the trailing edge portion and configured for being connected to the rear portion of the aerofoil body,
wherein when the first coupling portion of the liner is fixed to an outer surface of the aerofoil body:
  the trailing edge portion of the liner extends from the rear portion of the aerofoil body, and
  the second portion of the liner is connected to the rear portion of the aerofoil body, thus forming a cavity between the rear portion of the aerofoil body and the trailing edge portion of the liner.

Through the entire description, an 'aerofoil body' will be understood as the main part of a guide vane adapted to be installed within a tail bearing housing in a row with other aerofoil bodies. As known, the aerofoil body is arranged radially within the tail bearing housing and secured to both the inner and outer casing for effectively redirecting and stabilizing the incoming gas flow. To do so, the forward portion is arranged within the tail bearing housing as the foremost portion of the aerofoil body in respect to the incoming flow, while the rear portion is arranged closer to the exiting section of the gas flow from the tail bearing housing.

Further, the opposite outer surfaces, if not covered by the liner, complete the aerofoil shape (or, in other words, the aerodynamic profile) between the forward and rear portions thus providing an incident side and non-incident side in the guide vane.

Thus, the aerofoil body would be similar in shape to the guide vane itself if there were not trimmed portions or pockets to house the liner. In this regard, the aerofoil body is defined as a trimmed and pocketed guide vane.

The forward portion of the aerofoil body can either coincide with the leading edge of the guide vane if the aerofoil body is not trimmed, or be behind said leading edge if trimmed. As per the rear portion of the aerofoil body, it does not form the trailing edge of the guide vane aerodynamic profile. Instead, it is the trailing edge portion of the liner which forms the actual trailing edge of the whole aerodynamic profile of the guide vane, when the liner is coupled to the aerofoil body.

In this regard, the liner is shaped with a sheet like geometry, and, more in particular, it can be regarded as having a folded sheet geometry with respect to the sharp trailing edge portion.

In connection with the above, the trailing edge portion of the liner has been defined structurally as being shaped with a 'convex geometry' when considering the outer shape of the liner, that is, the part of the liner exposed to the outer stream of gas, thus completing the aerofoil shape (i.e., the aerodynamic profile of the vane). This definition means that the outer geometry of the liner is shaped as the regular cross-sectional shape of the trailing edge of a guide vane, wherein the rearmost part of the aerodynamic profile can be regarded as defined by two substantially flat surfaces, upper and lower, which approach gradually to each other, in such a way that they converge in a sharp arrowhead vertex.

In other words, regarding the whole aerodynamic profile of the guide vane, the aerofoil body primarily provides part of that aerodynamic profile to the vane, while further providing structural support for the liner fixed thereof.

In turn, the liner completes said aerodynamic profile of the guide vane when coupled to the aerofoil body. Advantageously, this coupling between the aerofoil body and the liner allows reducing the amount of material required to build the whole guide vane. As indicated previously, this is achieved by trimming part of the aerofoil body in those parts where the aerodynamic profile of the guide vane is defined by the shape of the liner.

As indicated previously, current concepts used in the industry for outlet guide vanes in tail bearing housings must be oversized in order to integrate a liner (coupled in a pocket machined in a surface of the guide vane) while maintaining predetermined aerodynamic ratios, such as the chord/length ratio.

In particular, increasing the outlet guide vane aerodynamic shape (i.e., the aerodynamic profile) means increasing the annular casings size, that is, the axial length of both the inner and the outer skins of the tail bearing housing, for dealing with the extra stress generated by the weight increase of the guide vanes, as well as to adjust the trailing edge-to rear flanges distance defined by thermal fight. For this reason, overall weight is also significantly increased.

Advantageously, the integration concept between the aerofoil body and the liner proposed by the present disclosure allows preventing said oversizing, and its corresponding weight increase, related to current solutions. This technical effect is achieved by defining hollow spaces (i.e., a cavities) inside the guide vane by trimming parts of the aerofoil body.

The actual amount of material of the aerofoil body to be trimmed corresponds to the parts of the guide vane whose aerodynamic profile is completed by the liner. As per the rear part of the guide vane, a cavity is thus defined between the rear portion of the aerofoil body and the forward-facing inner face of the trailing edge portion of the liner, or in other words, the concave geometry of the trailing edge portion of the liner, which completes the trailing edge part of the aerodynamic profile/shape of the guide vane.

Accordingly, the previously referred 'parasitic mass' in the trailing edge that the traditional design concept carries is not required to withstand the loads and, thus, the length of the outer and inner skins can also be reduced, as the distance driving the thermo-mechanical behaviour is the one from the trimmed end of the guide vane casting to the rear flanges. In this sense, the guide vane intersection with outer/inner case can be displaced upstream, and so the rear flanges of the casings can be pulled forward while maintaining similar thermo-mechanical stress, while allowing further reducing weight and engine length at the same time.

In a preferred embodiment, the liner is a noise attenuation liner.

In a particular embodiment, the outer surface of the aerofoil body to which the liner is fixed is the non-incidence side of the guide vane or the incidence side of the guide vane.

Advantageously, the proposed integration concept between an aerofoil body and a liner coupled thereof for completing the aerodynamic profile of a guide vane provides the designer with a high degree of freedom to define solutions which may require the presence of liners in one or both sides of a guide vane.

In a particular embodiment wherein the liner is a noise attenuation liner, the benefits associated to noise reduction properties can be provided to both sides, increasing the overall noise reduction effect.

In a particular embodiment, the liner further comprises a leading edge portion shaped with a convex geometry, and wherein when the first coupling portion of the liner is fixed to an outer surface of the aerofoil body:
   the leading edge portion of the liner extends from the forward portion of the aerofoil body, and
   the first portion of the liner is connected to the forward portion of the aerofoil body, thus forming a cavity between the forward portion of the aerofoil body and the leading edge portion of the liner.

Just as it happened with the trailing edge portion of the liner, the leading edge portion of the liner has been defined structurally as being shaped with a 'convex geometry'. Again, this definition means that the outer geometry of the liner is shaped as the regular cross-sectional shape of the leading edge of a guide vane, wherein the foremost part of the aerodynamic profile, which in this case is completed by the liner which provides aerodynamic continuity with the aerofoil body, is manufactured as a curved surface. Accordingly, the leading edge portion of the liner can be regarded as having a curved sheet-like geometry.

Advantageously, the amount of material of the aerofoil body trimmed according to this embodiment is increased, since the leading edge part of the aerodynamic profile of the guide vane is completed by the liner. As with the rear part of the guide vane, a cavity is thus defined between the forward portion of the aerofoil body and the inner face of the leading edge portion of the liner, or, in other words, the concave part of the leading edge portion of the liner. The overall weight reduction achieved by the disclosure is therefore increased in a greater extent.

In a particular embodiment, the forward portion of the aerofoil body comprises a leading edge portion.

In a particular embodiment, the liner is removably fixed to the aerofoil body, such that the first coupling portion is removably fixed to an outer surface of the aerofoil body, and the first and/or second portion are removably connected to the respective forward and/or rear portion of the aerofoil body.

Given that the liner and the aerofoil body can be disengaged in this embodiment, the recurring resource costs (both in time and economic) associated to maintenance operations, such as handling, repairing, or replacement are greatly reduced.

In a particular embodiment, the forward portion of the aerofoil body comprises a protrusion, and the first portion of the liner is configured to interlock with the protrusion, the first portion and the protrusion thus establishing a snap-fitting connection.

In a particular embodiment, the rear portion of the aerofoil body comprises a protrusion, and the second portion of the liner is configured to interlock with the protrusion, the second portion and the protrusion thus establishing a snap-fitting connection.

As previously defined, a cavity may be defined:
between the rear portion of the aerofoil body and the inner face of the trailing edge portion of the liner; and/or
between the forward portion of the aerofoil body and the inner face of the leading edge portion of the liner.

In particular, part of the liner projects a distance from the trimmed section (forward and/or rear portions of the aerofoil body). The convex geometry of the leading edge portion/trailing edge portion of the liner results in an extension of the liner itself returning back in order to mechanically contact the corresponding trimmed section (forward/rear portions of the aerofoil body) to close an internal volume, defining a hollow space (or cavity).

In a particular embodiment, the forward and/or rear portions of the aerofoil body comprise a support tab to engage with a respective end (first/second portions) of the liner.

In order to achieve a reliable and robust in-service connection which ensures permanent contact and prevents vibrations that could entail a risk for the integrity of the connection, in an embodiment the leading edge portion and/or the trailing edge portion of the liner are manufactured with a connection tolerance which results in a preloading effect once the liner and the aerofoil body are coupled. In other words, a spring effect is achieved between the liner and the aerofoil body such that the first and/or second portions are being pushed permanently against a respective support tab in the forward and/or rear portion of the aerofoil body.

In a particular embodiment, a support tab may undergo a machining process, such as milling, to improve the contact tolerances with the corresponding first and/or second portion of the liner.

In a more particular embodiment, a support tab and a corresponding first and/or second portion may be connected by crimping.

In a particular embodiment, an outer surface of the aerofoil body and the first coupling portion comprise complementary fixing means configured for matching with each other to fix the first coupling portion to said outer surface.

In a particular embodiment, the complementary fixing means comprise at least one fastener provided in the first coupling portion of the liner, the at least one fastener being configured for matching with at least one hole provided in an outer surface of the aerofoil body.

In a particular embodiment, the fastener and the hole are configured to couple to each other by means of a threaded section.

In a particular embodiment, the aerofoil body and the liner are integrally formed, preferably by an additive manufacturing process.

Advantageously, making use of Additive Layer Manufacturing (ALM) technology for producing the parts of the guide vane, that is, the aerofoil body and/or the liner allows reducing to a minimum potential geometrical deviations.

The tight dimensional tolerances achieved by ALM may allow optimizing the design of the liner in order to comprise a variable thickness to improve the behaviour in predetermined areas subjected to loads. Additionally, the trailing edge radius of curvature may also be produced with very tight dimensional tolerances, thus improving the aerodynamic.

In a particular embodiment, the first coupling portion is fixed to an outer surface of the aerofoil body by welding.

In a particular embodiment, the forward portion comprises a recess that provides a stepped transition from the forward portion to the outer surface of the aerofoil body to which the liner is fixed, wherein when the first coupling portion is fixed to the outer surface:
the first portion of the liner abuts the recess of the forward portion, and
the forward portion levels with the external shape of the liner, thus providing aerodynamic continuity.

In a particular embodiment, the leading edge portion and/or the trailing edge portion of the liner comprise a stiffening element configured for reinforcing the corresponding concave geometry which respectively define a cavity with the forward or rear portion of the aerofoil body.

In a particular embodiment, the liner further comprises:
a third portion extending from the second portion, and configured for being connected to the forward portion of the aerofoil body,
a second coupling portion extending between the third portion and the second portion, and opposite to the first coupling portion, wherein the second coupling portion is configured to be fixed to the opposite outer surface to which the first coupling portion is fixed.

In a second inventive aspect, the disclosure provides a vane assembly comprising at least one guide vane according to any of the embodiments of the first inventive aspect.

In a third inventive aspect, the disclosure provides a turbo machine comprising a vane assembly according to any of the embodiments of the second inventive aspect.

In a forth inventive aspect, the disclosure provides an aircraft comprising a turbo machine according to any of the embodiments of the third inventive aspect.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the disclosure will become clearly understood in view of the detailed description of the disclosure which becomes apparent from a preferred embodiment of the disclosure, given just as an example and not being limited thereto, with reference to the drawings.

DETAILED DESCRIPTION

Once the object of the disclosure has been outlined, specific non-limitative embodiments are described hereinafter.

Figure 1:
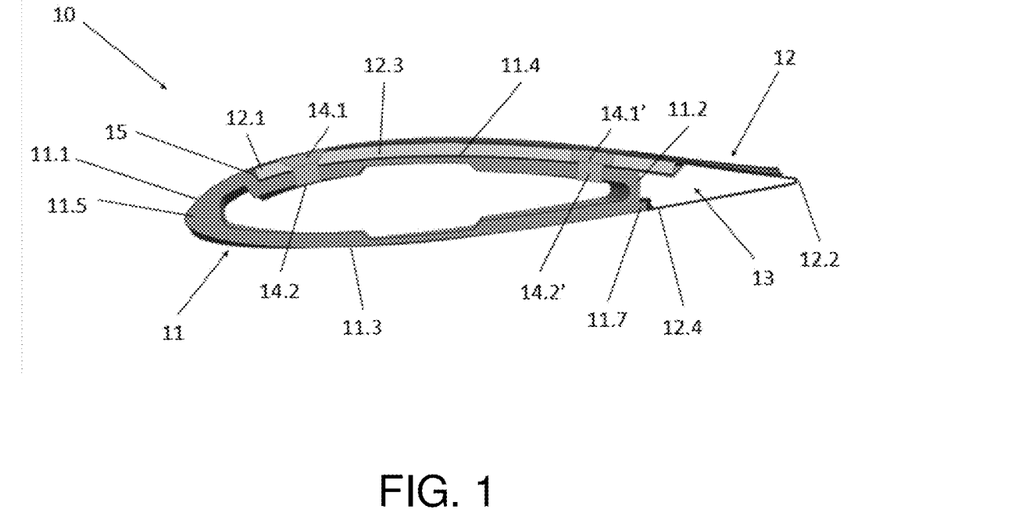
FIG. 1 This figure shows a cross-sectional view, that is, the aerodynamic profile, of a guide vane for a vane assembly of a turbo machine according to the disclosure.

FIG. 1 depicts a cross-sectional view of an embodiment of a guide vane (10) for a vane assembly (20) of a turbo machine (30) according to the disclosure. In particular, the guide vane (10) results from coupling an aerofoil body (11) and a liner (12) for completing the whole aerodynamic shape (i.e. aerodynamic profile) of the guide vane (10).

The aerofoil body (11) represents the main part of a guide vane (10) adapted to be installed within a vane assembly (20) in a row with other aerofoil bodies (11). The aerofoil body (11) depicted comprises a forward portion (11.1), i.e., the foremost part of the guide vane (10), which in this case comprises a leading edge portion (11.5) which actually represents the leading edge of the whole aerodynamic profile of the guide vane (10).

The aerofoil body (11) further comprises a rear portion (11.2), which in the depicted embodiment does not represent the trailing edge portion of the aerodynamic profile of the guide vane (10), given that said rear portion (11.2) is trimmed, thus reducing the total amount of material involved in the production of the whole guide vane (10).

Finally, the aerofoil body (11) comprises opposite outer surfaces (11.3, 11.4) (e.g., incidence side 11.3 and non-incidence side 11.4), extending between the forward portion (11.1) and the rear portion (11.2), configured for defining part of the external aerodynamic shape of the guide vane (10) and/or for coupling with the liner (12).

In the embodiment depicted, the liner (12) is a noise attenuation liner in the form of a sandwich panel basically including a porous sheet, a cell structure of appropriate characteristics, e.g. honeycomb structure, and a backing sheet, the liner (12) being configured for being fixed to the aerofoil body (11).

Regarding the actual aerodynamic shape of the complete guide vane (10), the liner (12) comprises a trailing edge portion (12.2), shaped with a convex geometry, extending from the rear portion (11.2) of the aerofoil body (11). More in particular, part of the liner (12) projects a distance from the trimmed section (rear portion (11.2) of the aerofoil body (11)). The convex geometry of the trailing edge portion (12.2) of the liner (12) results in an extension of the liner (12) itself returning back towards the trimmed section in order to mechanically contact said trimmed section to close an internal volume, defining a hollow space or cavity (13).

For the actual union of the liner (12) and the aerofoil body (11), giving rise to the complete shape of the guide vane (10), the liner (12) comprises a first portion (12.1) configured for being connected to the forward portion (11.1) of the aerofoil body (11), a first coupling portion (12.3) extending between the first portion (12.1) and the trailing edge portion (12.2) and configured for being fixed to an outer surface (11.3, 11.4) of the aerofoil body (11), and a second portion (12.4) extending from the trailing edge portion (12.2) and configured for being connected to the rear portion (11.2) of the aerofoil body (11).

In the embodiment shown, the first coupling portion (12.3) is fixed to an outer surface (11.4) of the aerofoil body (11). More in particular, said outer surface (11.4) of the aerofoil body (11) to which the liner (12) is fixed is separated from the forward portion (11.1) of the aerofoil body (11) by means of a recess (15), in the form of a stepped transition, provided at said forward portion (11.1) of the aerofoil body (11), which divides the local shape of the aerofoil body (11) such that the forward portion (11.1) is defined as an upper portion with respect to the outer surface (11.4).

As it can be seen, the first coupling portion (12.3) of the liner (12) is fixed to the outer surface (11.4), while the first portion (12.1) of the liner (12) abuts the recess (15), so that the forward portion (11.1) of the aerofoil body (11) levels with the external shape of the liner (12), thus providing aerodynamic continuity and completing the aerodynamic shape of the guide vane (10).

Additionally, in the present embodiment, the liner (12) and the aerofoil body (11) can be disengaged in order to ease maintenance operations, such as handling, repairing, or even replacement of the whole liner (12). In this regard, a removable coupling is established between the liner (12) and the aerofoil body, such that), the first coupling portion (12.3) of the liner (12) can be removably fixed to the outer surface (11.4) of the aerofoil body (11). In a similar manner, the first portion (12.1) of the liner (12), which is shown abutting the recess (15) of the forward portion (11.1) of the aerofoil body (11) can be removably connected to the forward portion (11.1) of the aerofoil body (11).

In the particular embodiment shown, the outer surface (11.4) of the aerofoil body (11) and the first coupling portion (12.3) comprise complementary fixing means (14.1, 14.2) in the form of a fastener (14.1, 14.1') provided in the first coupling portion (12.3) and a hole (14.2, 14.2') provided in the outer surface (11.4), configured for matching with each other to removably fix the first coupling portion (12.3) of the liner (12) to the outer surface (11.4) of the aerofoil body (11).

On the other hand, the second portion (12.4) of the liner (12) is connected to the rear portion (11.2) of the aerofoil body (11), thus forming the previously defined hollow space, or cavity (13), between the rear portion (11.2) of the aerofoil body (11) and the trailing edge portion (12.2) of the liner (12), which permits reducing the total amount of material used for manufacturing the guide vane (10), resulting in a significant weight reduction.

For this purpose, the rear portion (11.2) (trimmed section) comprises a protrusion (11.7) in the form of a support tab configured for engaging with a distal end of the second portion (12.4) of the liner (12). In particular, the second portion (12.4) is configured to interlock with said support tab (11.7), such that a removable snap-fitting connection is established. More in particular, the trailing edge portion (12.2) of the liner is manufactured such that, once the second portion (12.4) has engaged the support tab (11.7) of the aerofoil body (11) a spring effect is generated in such way that the second portion (12.4) is pushed permanently against the support tab (11.7), thus ensuring a robust connection which prevents vibrations.

Figure 2:
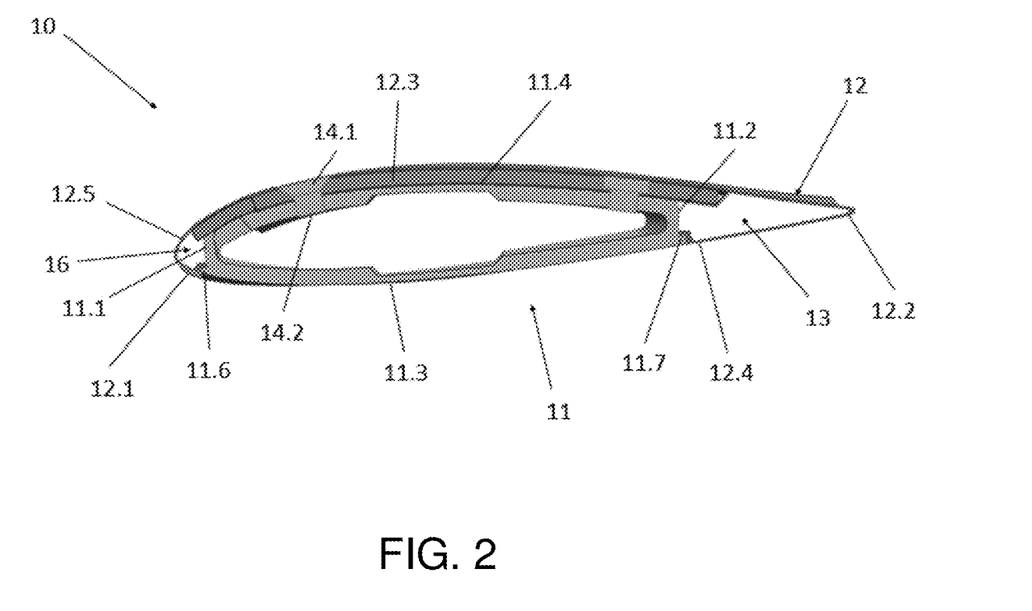
FIG. 2 This figure shows a cross-sectional view, that is, the aerodynamic profile, of a guide vane for a vane assembly of a turbo machine according to the disclosure.

FIG. 2 represents an embodiment similar to that of FIG. 1, in fact sharing most of the technical features disclosed therein, but where the following modifications have been made.

The forward portion (11.1) of the aerofoil body (11) of the embodiment shown in FIG. 2 does not define the leading edge portion of the aerodynamic profile of the guide vane (10), given that said forward portion (11.1) is trimmed, thus reducing the total amount of material involved in the production of the whole guide vane (10).

Regarding the actual aerodynamic shape of the complete guide vane (10) corresponding to the embodiment shown in FIG. 2 with respect to the embodiment shown in FIG. 1, the liner (12) comprises a leading edge portion (12.5), shaped with a convex geometry, extending from the forward portion (11.1) of the aerofoil body (11). More in particular, part of the liner (12) projects a distance from the trimmed section (forward portion (11.1) of the aerofoil body (11)). The convex geometry of the leading edge portion (12.2) of the liner (12) results in an extension of the liner (12) itself returning back towards the trimmed section in order to mechanically contact said trimmed section (forward portion (11.1)) to close an internal volume, defining a further hollow space or cavity (16).

Given that the liner (12) comprises a leading edge portion (12.5) extending from the forward portion (11.1) of the aerofoil body (11), in this embodiment the liner (12) defines the leading edge, the trailing edge and the connection therebetween of the aerodynamic profile of the complete guide vane (10). The outer surface (11.4) of the aerofoil body (11) to which the liner (12) is removably fixed is thus completely covered and neither the forward portion (11.1) nor said outer surface (11.4) comprise any recessed section in this embodiment.

The first portion (12.1) of the liner (12) is connected to the forward portion (11.1) of the aerofoil body (11), thus forming the previously defined hollow space, or cavity (16), between the forward portion (11.1) of the aerofoil body (11) and the leading edge portion (12.5) of the liner (12), which permits reducing the total amount of material used for manufacturing the guide vane (10), resulting in a significant weight reduction.

For this purpose, the forward portion (11.1) (trimmed section) comprises a protrusion (11.6) in the form of a support tab configured for engaging with a distal end of the first portion (12.1) of the liner (12). In particular, the first portion (12.1) is configured to interlock with said support tab (11.6), such that a removable snap-fitting connection is established. More in particular, in this embodiment the leading edge portion (12.5) of the liner is manufactured such that, once the first portion (12.1) has engaged the support tab (11.6) of the aerofoil body (11) a spring effect is generated in such way that the first portion (12.1) is pushed permanently against the support tab (11.6), thus ensuring a robust connection which prevents vibrations.

Regarding the opposite edge of the aerodynamic profile of the guide vane (10), that is, the trailing edge, the one represented in FIG. 2 corresponds identically to that of FIG. 1. Accordingly, it comprises the same structure and is defined by the same technical features.

Figure 3:
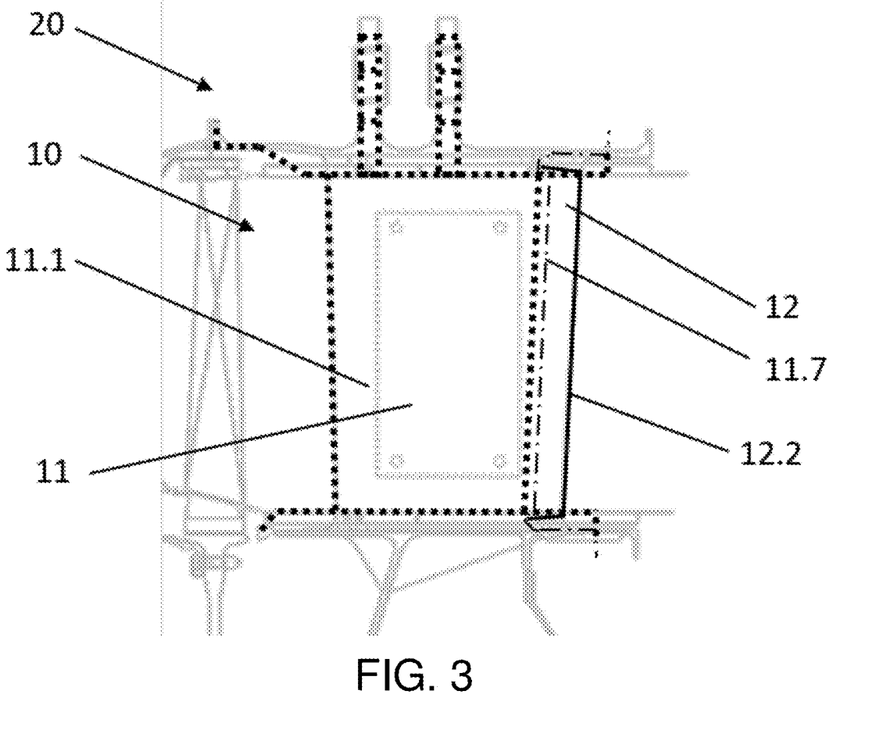
FIG. 3 This figure shows a schematic representation of a lateral view of a guide vane according to the disclosure, disposed between an inner and an outer casing.

FIG. 3 depicts a schematic representation of a lateral view of a guide vane (10) disposed between the inner and outer casings of a guide vane assembly (20) of the tail bearing housing support structure, according to the disclosure.

This figure highlights the relation between the dimensions of the different elements which are assembled in order to complete a guide vane (10) according to an embodiment of the disclosure (i.e., the aerofoil body (11) and the liner (12)), when compared with the dimensions of a traditional guide vane of a tail bearing housing support structure without liners.

For this purpose, those elements are superimposed on each other and are represented according to the following criteria:

The dashed line has been used to represent the profile and dimensions corresponding to the traditional guide vane without the liner.

The dot-dash line corresponds to the profile of the support tab (11.7) which would protrude from the trimmed rear portion (11.2) of an aerofoil body (11) of a guide vane (10) according to the disclosure.

Finally, the continuous line represents the profile of the liner (12), once is has been coupled to the aerofoil body (11).

As it can be seen, the rearmost part of the continuous and the dashed line when extending vertically coincide. Accordingly, for a given size of a vane without liners, and its corresponding inner and outer casings, it is shown that a guide vane (10) according to the disclosure, comprising an aerofoil body (11) and a liner (12) extending a length from the leading edge of the vane without liners, would not require the displacement of the corresponding inner and outer casings. In other words, the present disclosure achieves the implementation of a liner (12) without the need to oversize the engine, thus reducing the weight when compared to any of the current solutions in the industry provided for guide vanes with liners.

Additionally, in the particular embodiment shown, the support tab (11.7) is trimmed before intersection with the inner and outer casings to avoid stress issues. In other words, a certain clearance is left between the lower and upper ends of the support tab (11.7) and the inner and outer casings, respectively.

Figure 4:
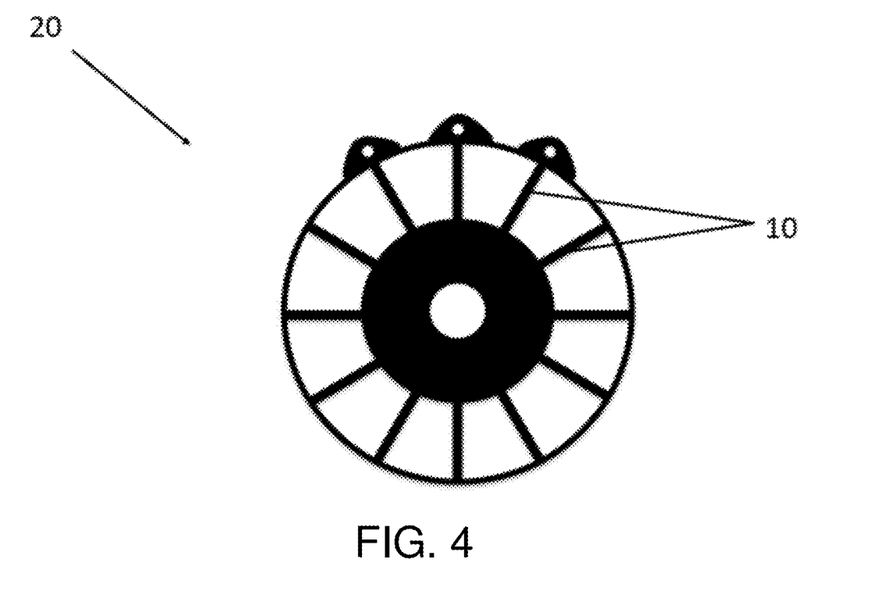
FIG. 4 This figure shows a schematic representation of a front view of a guide vane assembly comprising a plurality of guide vanes according to the disclosure.

FIG. 4 represents a schematic representation of a front view of an embodiment of a guide vane assembly (20) comprising a plurality of guide vanes (10) according to the disclosure. In particular, the guide vanes (10) are disposed radially between an inner and outer annulus. More in particular, FIG. 4 depicts the outlet guide vanes (10) disposed in the tail bearing housing support structure of an aero engine (30), that is, the engine section before the exit nozzle.

Figure 5:
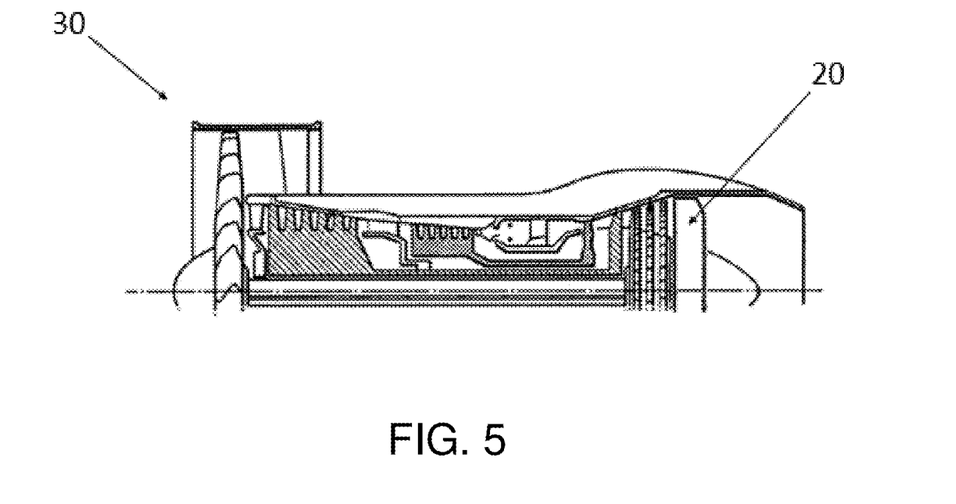
FIG. 5 This figure shows a turbo machine comprising a plurality of vane assemblies, each of the vane assemblies comprising in turn a plurality of guide vanes according to an embodiment of the disclosure.

FIG. 5 depicts a turbo machine (30) comprising a plurality of vane assemblies (20), each of the vane assemblies (20) comprising, in turn, a plurality of guide vanes (10) according to the disclosure.

Figure 6:
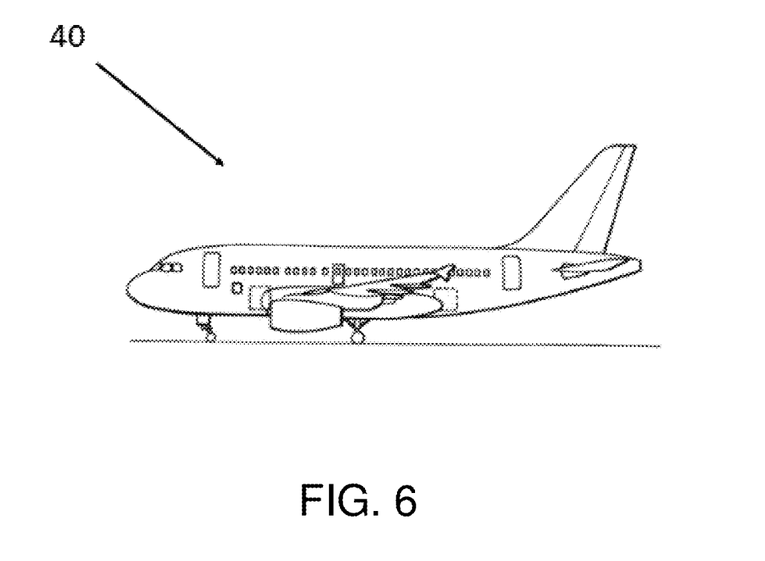
FIG. 6 This figure shows an aircraft comprising a turbo machine comprising a plurality of vane assemblies according to an embodiment of the disclosure.

FIG. 6 depicts an aircraft (40), comprising a turbo machine (30) comprising a plurality of vane assemblies (20) according to an embodiment of the disclosure.

What is claimed is:

1. A guide vane for a vane assembly of a turbo machine, the guide vane comprising:
   an aerofoil body comprising:
      a forward portion;
      a rear portion; and
      opposite outer surfaces, extending between the forward portion and the rear portion; and
   a liner configured for being fixed to the aerofoil body, the liner comprising:
      a first portion configured for being connected to the forward portion of the aerofoil body;
      a trailing edge portion shaped with convex geometry;
      a first coupling portion extending between the first portion and the trailing edge portion and configured for being fixed to an outer surface of the aerofoil body; and
      a second portion extending from the trailing edge portion and configured for being connected to the rear portion of the aerofoil body,
   wherein with the first coupling portion of the liner fixed to an outer surface of the aerofoil body:
      the trailing edge portion of the liner extends from the rear portion of the aerofoil body, and
      the second portion of the liner is connected to the rear portion of the aerofoil body, thus forming a cavity between the rear portion of the aerofoil body and the trailing edge portion of the liner, and
   wherein a rear surface of the rear portion of the aerofoil body forms a forward edge of the cavity and a forward-facing inner face of the liner forms a rear edge of the cavity.

2. The guide vane according to claim 1, wherein:
   the rear portion of the aerofoil body is trimmed, defining a rear trimmed section extending between the opposite outer surfaces,
   the trailing edge portion of the liner extends from the rear trimmed section, and
   the second portion of the liner is connected to the rear trimmed section, such that the trailing edge portion of the liner defines the trailing edge of the guide vane, forming a cavity between the rear trimmed section and the trailing edge portion of the liner.

3. The guide vane according to claim 1, wherein the liner further comprises a leading edge portion shaped with convex geometry, and
   wherein with the first coupling portion of the liner fixed to an outer surface of the aerofoil body:
      the leading edge portion of the liner extends from the forward portion of the aerofoil body, and
      the first portion of the liner is connected to the forward portion of the aerofoil body, thus forming a cavity between the forward portion of the aerofoil body and the leading edge portion of the liner.

4. The guide vane according to claim 3, wherein:
   the forward portion of the aerofoil body is trimmed, defining a forward trimmed section extending between the opposite outer surfaces,
   the leading edge portion of the liner extends from the forward trimmed section of the guide vane, and
   the first portion of the liner is connected to the forward trimmed section, such that the leading edge portion of the liner defines the leading edge of the guide vane, forming a cavity between the forward trimmed section and the leading edge portion of the liner.

5. The guide vane according to claim 1, wherein the forward portion of the aerofoil body comprises a leading edge portion.

6. The guide vane according to claim 5, wherein the forward portion comprises a recess that provides a stepped transition from the forward portion to the outer surface of the aerofoil body to which the liner is fixed, wherein when the first coupling portion is fixed to the outer surface:
   the first portion of the liner abuts the recess of the forward portion, and
   the forward portion levels with the external shape of the liner, thus providing aerodynamic continuity.

7. The guide vane according to claim 1, wherein the liner is removably fixed to the aerofoil body, such that the first coupling portion is removably fixed to an outer surface of the aerofoil body, and at least one of the first or second portion is removably connected to the respective forward or rear portion of the aerofoil body.

8. The guide vane according to claim 1, wherein the forward portion of the aerofoil body comprises a protrusion, and wherein the first portion of the liner is configured to interlock with the protrusion, the first portion and the protrusion thus establishing a snap-fitting connection.

9. The guide vane according to claim 1, wherein the rear portion of the aerofoil body comprises a protrusion, and wherein the second portion of the liner is configured to interlock with the protrusion, the second portion and the protrusion thus establishing a snap-fitting connection.

10. The guide vane according to claim 1, wherein an outer surface of the aerofoil body and the first coupling portion comprise complementary fixing means configured for matching with each other to fix the first coupling portion to said outer surface.

11. The guide vane according to claim 10, wherein the complementary fixing means comprise at least one fastener provided in the first coupling portion of the liner, the at least one fastener being configured for matching with at least one hole provided in an outer surface of the aerofoil body.

12. The guide vane according to claim 1, wherein the aerofoil body and the liner are integrally formed.

13. The guide vane according to claim 12, wherein the aerofoil body and the liner are integrally formed by an additive manufacturing process.

14. The guide vane according to claim 1, wherein the first coupling portion is fixed to an outer surface of the aerofoil body by welding.

15. The guide vane according to claim 1, wherein at least one of a leading edge portion or the trailing edge portion of the liner comprises a stiffening element configured for reinforcing an inner face of the leading edge portion or an inner face of the trailing edge portion which respectively define a cavity with the forward or rear portion of the aerofoil body.

16. The guide vane according to claim 1, wherein the liner is a noise attenuation liner.

17. The guide vane according to claim 1, wherein the outer surface of the aerofoil body to which the liner is fixed is a non-incidence side of the guide vane or an incidence side of the guide vane.

18. The guide vane according to claim 1, wherein the liner further comprises:
   a third portion extending from the second portion and configured for being connected to the forward portion of the aerofoil body, and a second coupling portion extending between the third portion and the second portion, and opposite to the first coupling portion, wherein the second coupling portion is configured to be fixed to the opposite outer surface to which the first coupling portion is fixed.

\* \* \* \* \*